Feb. 9, 1954  W. F. METZGER  2,668,684
DUSTPROOF DAMPER
Filed June 18, 1949  2 Sheets-Sheet 1
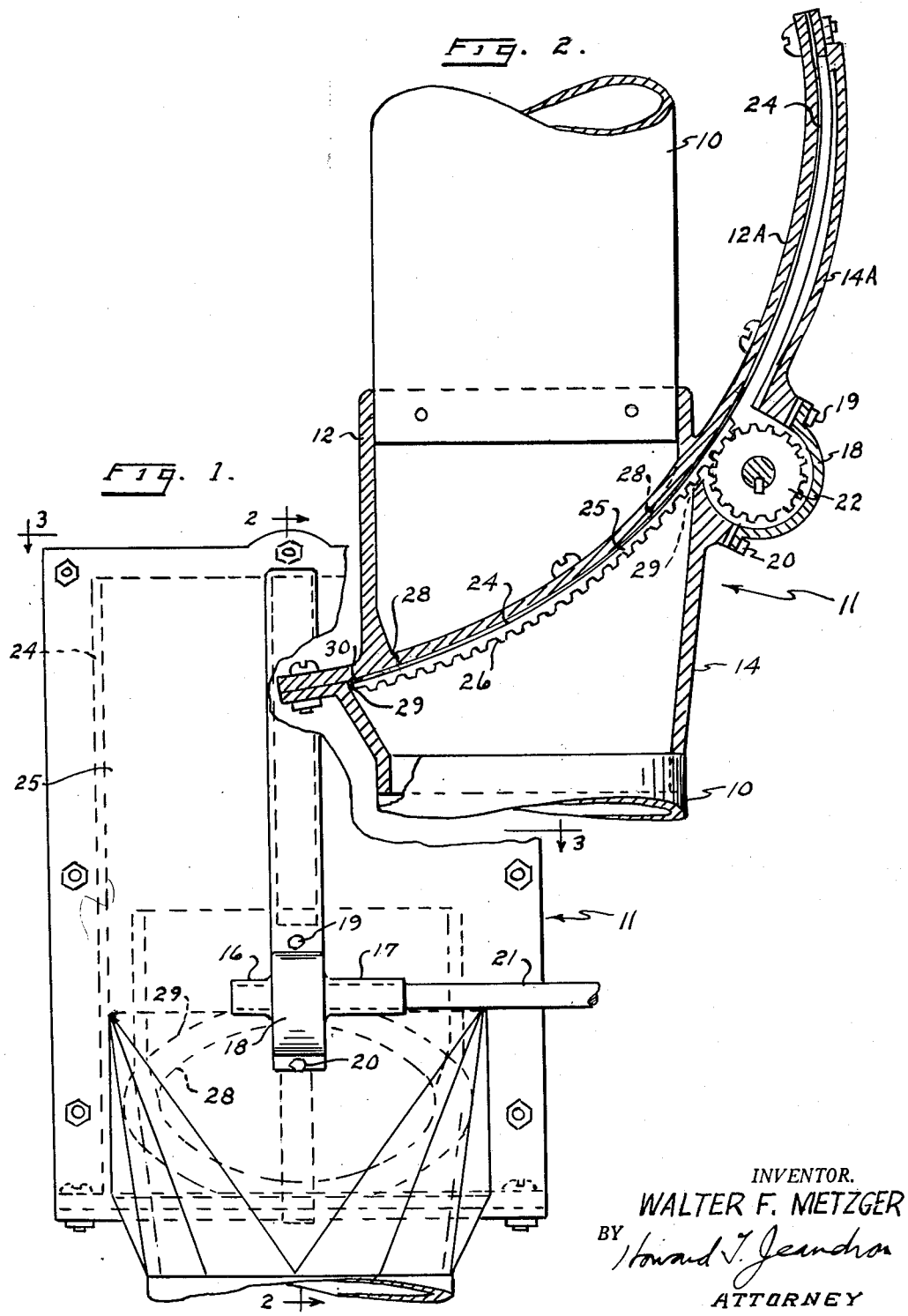
INVENTOR.
WALTER F. METZGER
BY Howard J. Jeandron
ATTORNEY Feb. 9, 1954 W. F. METZGER 2,668,684
DUSTPROOF DAMPER
Filed June 18, 1949 2 Sheets-Sheet 2
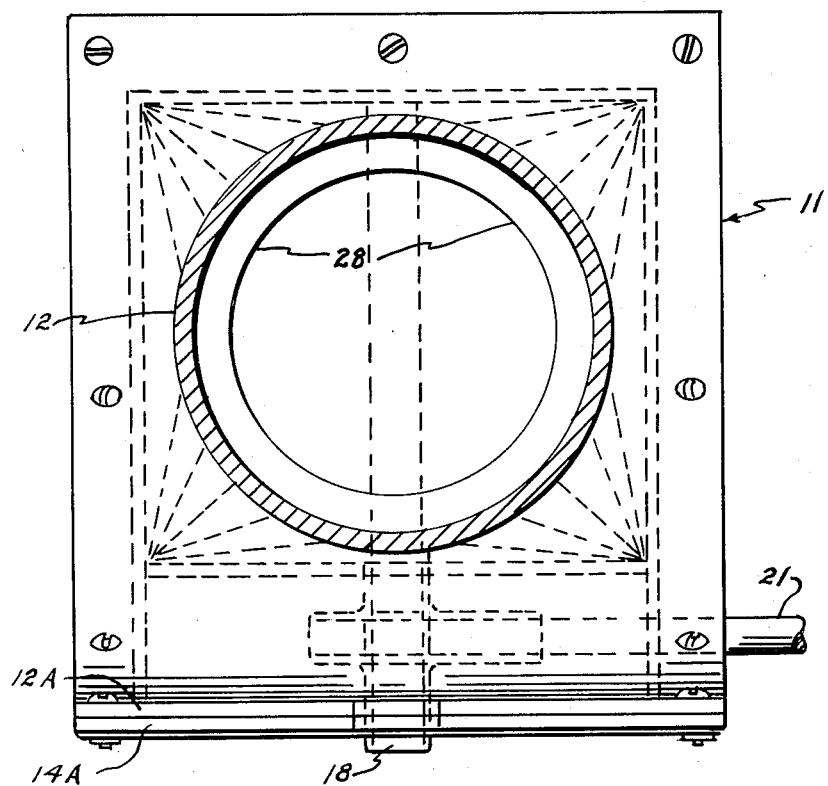
INVENTOR.
WALTER F. METZGER
BY Howard J. Jeandron
ATTORNEY Patented Feb. 9, 1954

2,668,684

UNITED STATES PATENT OFFICE 2,668,684

DUSTPROOF DAMPER

Walter F. Metzger, Keyport, N. J.

Application June 18, 1949, Serial No. 99,969

2 Claims. (Cl. 251—54)

This invention relates to dampers and more particularly to a dustproof damper for feeding ducts for grain mills.

In the past the grain mills have utilized the simple damper plate that is positioned at 90° to the duct or feeder line and when the feeder is to be sealed, the damper plate is forced into the duct or feeder pipe to close the complete inner area of the feeder line and vice versa when the feed line is to be opened and used, the damper plate is withdrawn. There are a number of defects to this type of mechanism. In the first place the edge of the damper plate becomes badly worn with the grain pouring over the edge of the plate and in time does not seal or close the inner area of the duct. Due to the accumulation of the grain dust, any groove or track formed to support the damper plate becomes clogged with this dust and there is difficulty in moving the damper plate and in positioning the damper plate in a tight sealed relationship with the duct. A further annoying feature of the old type of damper is the fact that the dust and grain adhering to the damper plate is withdrawn from the feeder duct with the damper plate when it is opened and this grain and dust accumulates on the floor below the area where the damper plate may be positioned. Another objectionable feature of the old type damper plate is the fact that considerable area adjoining the duct must be provided to permit withdrawing the damper plate and this area may be hard to provide.

An object of this invention is to provide a dustproof damper for a grain feeder duct that is easy to operate and provides a positive closure or seal for the feeder duct.

A still further object of this invention is to provide a dust-proof damper in which a curved damper plate is provided and fitted to be positioned in close proximity to the duct in its open position and means are provided to permit an easy sliding movement of the damper plate into or out of the feeder duct.

A further object of this invention is to provide a dustproof damper in which a curved damper plate is provided to be mounted and slide along a curved track or groove that may be easily cleared of adhering grain or dust by the movement of the damper plate and in which the sealing end of the damper plate is fitted into an area of the damper to which grain or dust cannot adhere.

A still further object of this invention is to provide a dustproof damper for a feeder duct in which the damper plate is completely enclosed at all times and in which the grain and dust that may adhere to the damper plate will be cleared from the damper plate when it is withdrawn from the duct and all grain and dust will drop into the feeder duct.

A further object of this invention is to provide a dustproof damper in which the damper plate is formed and supported to rotate in a given radius so that it may be moved or positioned within the feeder duct from a fully open position to a fully closed or sealed position or may be moved to any intermediate position as desired to control the flow of grain.

Further objects of this invention shall be apparent by reference to the accompanying description and the drawings in which Fig. 1 illustrates a front elevational view of a feeder duct and the dustproof damper, Fig. 2 is a cross sectional view taken on line 2—2 of Fig. 1, and Fig. 3 illustrates a plan view taken on line 3—3 of Fig. 1.

Referring to the figures there is illustrated a grain feeder duct 10 with a dustproof damper 11 mounted between the upper duct 10 and the lower duct 10. The dustproof damper 11 is provided with an upper housing 12 and a lower housing 14. The two housings 12 and 14 are formed to mate with each other on a common predetermined radius and in addition the housing 12 is provided with an extended plate supporting housing 12A while the housing 14 is provided with an extended plate supporting housing 14A, the housings 12A and 14A are formed to carry out the same common predetermined radius. In addition the housing 14 is provided with two shaft supporting bearings 16 and 17, the bearings 16 and 17 being formed as split bearings with a removable cover 18, the bearings and cover being supported or affixed to the housing 14 by means of a pair of supporting bolts 19 and 20. Within the bearings 16 and 17 a shaft 21 is supported and a pinion gear 22 is connected to or affixed to the shaft 21 and positioned centrally within the housing formed by the housing 14 and the removable cover 18. Within the radius of the adjoining portions of the housing 12—12A and 14—14A there is formed a groove or track 24 into which a damper plate 25 is mounted. The damper plate 25 is generally rectangular in shape and is provided with a rack gear 26 affixed along the center line of the longest dimension of the damper plate. The rack gear 26 is formed to mate with and be driven by the pinion gear 22. As illustrated in Fig. 2 the damper is shown in a closed position and by mounting a handle or driving means (not shown) to the shaft 21 and rotating the gear 22 in a clockwise rotation, the pinion rack 26 will be moved upward carrying the damper plate 25 in its track 24 up into the housing formed by the mating portions 12A and 14A to thus position the damper in an open position. The clearance between the housings 12A and 14A is formed so that the damper plate 25 and pinion rack 26 will fit snugly yet move easily, thus any grain or dust that may adhere to either the damper plate or pinion rack will be scraped off and dropped back into the duct 10. The formation of housing 12 and housing 14 where they mate on the inner periphery is such that the housing 12 at its lowest extremity is formed with a restricted throat area 28 while the lower housing 14 is provided with an enlarged receiving mouth area 29. This provides an internal shoulder 30 that faces downward into the duct 11. This is purposely provided so that grain and dust cannot adhere to these vital areas. The shoulder 30 will be easily cleared and be kept clear by the movement of the damper plate 25. It is apparent that any grain or dust that should adhere to either of these areas will be scraped off and drop into the duct 10. It is also apparent that by means of the rack and pinion, the damper plate 25 can be easily positioned to an open or closed or intermediate position if desired. And with the end of the damper plate being continually worn by the abrasion of the grain, this damper plate is so nested under the shoulder face 30 that it will not permit leakage as there is ample area to provide a sealed relationship.

The dustproof damper illustrated in the drawings is one modification as applied to a grain feeding duct but this device may be similarly applied in a chimney as an ordinary damper for controlling smoke or draft within the chimney and similarly this dustproof damper may be applied to any duct whether it be for controlling the flow of a fluid, a gas or solid particles as long as the damper provides the same features as illustrated and described in this application without departing from the spirit of this invention and this invention shall be limited only by the appended claims.

What is claimed is:

1. A dustproof damper for granular material mounted in a duct comprising a casing that is divided into two enclosing parts, each part provided with an open throat to fit said duct, said throats positioned in opposed relationship, said two portions of said casing formed with mating faces, said mating faces providing an enclosed guide track for a damper, said guide track being curved to lie adjacent to the duct, a damper formed to fit between said tracks and in one position to completely close said duct, a rack and pinion with a shaft, said rack affixed to said damper, said pinion meshing with said rack and affixed to said shaft, said shaft supported by a bearing mounted between the two mating housings, means to move said damper between the open and closed position with the rotation of said shaft.

2. In a dustproof damper according to claim 1, said upper mating housing formed with a slightly restricted throat at the mating face, said lower mating housing formed with an enlarged receiving throat at the mating face to provide an internal shoulder facing downward, said damper slideably mounted and pressed firmly against the upper housing, means to move said damper between the open and closed position with the rotation of said shaft and means to scrape the surface of said restricted throat of said upper housing and guide tracks with the closing of said damper.

WALTER F. METZGER.

References Cited in the file of this patent

UNITED STATES PATENTS

| Number | Name | Date |
|---|---|---|
| 344,088 | Donkin | June 22, 1886 |
| 720,428 | Hetzel | Feb. 10, 1903 |
| 738,001 | Cochran | Sept. 1, 1903 |
| 1,066,978 | Babbitt | July 8, 1913 |
| 1,424,624 | Cyran | Aug. 1, 1922 |
| 1,667,959 | Talbot | May 1, 1928 |
| 2,142,236 | Campbell | Jan. 3, 1939 |
| 2,222,280 | Batho | Nov. 19, 1940 |

FOREIGN PATENTS

| Number | Country | Date |
|---|---|---|
| 502 | Great Britain | of 1915 |
| 95,535 | Switzerland | of 1921 |
| 511,268 | Germany | of 1930 |